(12) United States Patent
Masoero et al.

(10) Patent No.: US 11,945,305 B2
(45) Date of Patent: Apr. 2, 2024

(54) METHOD FOR THE PERFORMANCE-ENHANCING DRIVER ASSISTANCE OF A ROAD VEHICLE WITH AN AUGMENTED REALITY INTERFACE

(71) Applicant: FERRARI S.p.A., Modena (IT)

(72) Inventors: Erik Masoero, Modena (IT); Pasquale Vitiello, Modena (IT); Filippo Serafini, Modena (IT)

(73) Assignee: FERRARI S.p.A., Modena (IT)

( * ) Notice: Subject to any disclaimer, the term of this patent is extended or adjusted under 35 U.S.C. 154(b) by 163 days.

(21) Appl. No.: 17/194,384

(22) Filed: Mar. 8, 2021

(65) Prior Publication Data
US 2021/0276422 A1 Sep. 9, 2021

(30) Foreign Application Priority Data
Mar. 9, 2020 (IT) .......................... 102020000004891

(51) Int. Cl.
*B60K 35/00* (2006.01)
*B60W 30/095* (2012.01)
(Continued)

(52) U.S. Cl.
CPC ......... *B60K 35/00* (2013.01); *B60W 30/0956* (2013.01); *B60W 40/08* (2013.01);
(Continued)

(58) Field of Classification Search
CPC .............. B60K 35/00; B60K 2370/177; B60K 2370/77; B60W 30/0956; B60W 40/08;
(Continued)

(56) References Cited

U.S. PATENT DOCUMENTS 6,754,609 B2 * 6/2004 Lescourret ............. G01B 7/004
702/158
8,687,056 B2 * 4/2014 Yahav .................. G08G 5/0021
348/115

(Continued)

FOREIGN PATENT DOCUMENTS

DE  102015225371 A1 * 6/2017 ............. B60K 35/00
DE  102015225371 A1    6/2017
(Continued)

OTHER PUBLICATIONS

"A Novel Positioning and Orientation System Based on Three-Axis Magnetic Coils", C. Hu et al. IEEE Transactions on Magnetics, vol. 48, No. 7, Jul. 2012, pp. 2211-2219 (Year: 2012).*

(Continued)

*Primary Examiner* — Peter D Nolan
*Assistant Examiner* — Tanya C Sienko
(74) *Attorney, Agent, or Firm* — CANTOR COLBURN LLP

(57) ABSTRACT

A method for the performance-enhancing driver assistance of a road vehicle driven by a driver comprises the steps of: determining the current position and orientation of the road vehicle, detecting a plurality of environmental data concerning the surrounding environment, detecting a plurality of dynamic data of the vehicle, determining the current position and orientation of a helmet within the road vehicle and suggesting to the driver, by means of an augmented reality interface device, one or more corrective actions to be carried out in order to accomplish a mission optimizing a cost function.

14 Claims, 4 Drawing Sheets

(51) Int. Cl.
  *B60W 40/08* (2012.01)
  *B60W 50/14* (2020.01)
  *G01C 21/34* (2006.01)
  *G01D 5/20* (2006.01)
(52) U.S. Cl.
  CPC ......... *B60W 50/14* (2013.01); *G01C 21/3453* (2013.01); *G01D 5/20* (2013.01); *B60K 2370/177* (2019.05); *B60K 2370/77* (2019.05); *B60W 2420/40* (2013.01); *B60W 2420/42* (2013.01); *B60W 2420/50* (2013.01)
(58) Field of Classification Search
  CPC ............. B60W 50/14; B60W 2420/40; B60W 2420/42; B60W 2420/50; G01C 21/3453; G01D 5/20
  See application file for complete search history.

(56) References Cited

U.S. PATENT DOCUMENTS

| | | | | |
|---|---|---|---|---|
| 8,924,139 | B2* | 12/2014 | Louis | G08G 5/045 701/301 |
| 10,469,769 | B1* | 11/2019 | Mukherjee | G06F 3/011 |
| 11,487,122 | B1* | 11/2022 | Boone | B63B 49/00 |
| 2015/0158469 | A1* | 6/2015 | Cheatham, III | B60T 8/17558 701/96 |
| 2016/0167672 | A1* | 6/2016 | Krueger | G16H 40/63 340/576 |
| 2017/0169612 | A1* | 6/2017 | Cashen | G06T 19/006 |
| 2018/0025647 | A1* | 1/2018 | Krnja | G08G 1/052 340/905 |
| 2018/0061243 | A1* | 3/2018 | Shloosh | G08G 5/0043 |
| 2018/0095280 | A1* | 4/2018 | Gallery | G02B 27/0176 |
| 2018/0354509 | A1* | 12/2018 | Mullins | B60K 35/00 |
| 2020/0346692 | A1* | 11/2020 | Wall | B60Q 9/008 |
| 2020/0410963 | A1* | 12/2020 | Nagata | G09G 3/002 |
| 2021/0142526 | A1* | 5/2021 | Mantyjarvi | B60W 50/0097 |
| 2021/0221368 | A1* | 7/2021 | Lavi | G06T 7/246 |
| 2021/0356279 | A1* | 11/2021 | Szigeti | G01C 21/3407 |
| 2022/0089170 | A1* | 3/2022 | Hu | B60W 60/0053 |

FOREIGN PATENT DOCUMENTS

| | | | | |
|---|---|---|---|---|
| EP | 3048025 | A1 | 7/2016 | |
| EP | 3138752 | A2 | 3/2017 | |
| EP | 3138752 | A3 * | 3/2017 | ........ B60W 50/0097 |
| KR | 101767434 | B1 * | 8/2017 | ............ B60W 50/14 |
| WO | WO-2019128748 | A1 * | 7/2019 | ......... G02B 27/0172 |

OTHER PUBLICATIONS

Translation of DE102015225371 from Espacenet (Year: 2022).*
Translation of KR 101767434 B1 from Espacenet (Year: 2022).*
Translation of EP3138752 from Espacenet (Year: 2022).*
"FlightTracker: A Novel Optical/Inertial Tracker for Cockpit Enhanced Vision" by E. Foxlin et al., Proceedings of the Third IEEE and ACM International Symposium on Mixed and Augmented Reality (ISMAR 2004) (Year: 2004).*
Machine translation of WO2019128748A1 downloaded from IP.com Aug. 18, 2023 (Year: 2023).*
Search Report and Written Opinion for Italian Patent Application No. 102020000004891, 8 pages.

* cited by examiner

METHOD FOR THE PERFORMANCE-ENHANCING DRIVER ASSISTANCE OF A ROAD VEHICLE WITH AN AUGMENTED REALITY INTERFACE

CROSS-REFERENCE TO RELATED APPLICATIONS

This patent application claims priority from Italian patent application no. 102020000004891 filed on Mar. 9, 2020, the entire disclosure of which is incorporated herein by reference.

TECHNICAL FIELD

The invention relates to a method for a performance-enhancing driver assistance of a road vehicle, to a relative performance-enhancing driver-assistance system and to a relative road vehicle.

PRIOR ART

Generally speaking, the performances of a vehicle (speed, times, consumptions, mileage, etc.) are not maximized because of different elements (limits set by the law, driver's ability, atmospheric conditions, . . . )

For example, speed limits on roads open to traffic are much lower than the actual performances offered by a car, especially in case of a high-performance sports car. As a consequence, when normally driving on a road, only a small part of the actual capacities of a high-performance sports car is used. For this reason, it frequently happens that the owner of a high-performance sports car occasionally decides to make some laps on a track, so as to try and fully enjoy the performances offered by the car. However, for an inexperienced driver, high-performance driving on a track can turn out to be very complicated, since it is completely different from everyday driving on roads open to traffic. In particular, an inexperienced driver can have a very hard time understanding the actual limits of the car and, as a consequence, there is, on the one hand, the chance that the performances of the car are not completely exploited and, on the other hand, there is the risk of going off the road, which is potentially dangerous both for the integrity of the car and for the safety of the driver.

Furthermore, an inexperienced driver might not be aware of the ideal trajectories to be followed in order to optimize track times.

On the other hand, the owner of a high-performance sports car, while driving on roads open to traffic, can try and maximize other types of performances, other than speed, such as for example the mileage and, hence, reducing consumption.

In recent years, for driver assistance, many electronic assistance devices (for instance, anti-lock braking systems or ABS, traction control systems or ASR, stability control . . . ) were developed, which change the commands given by the driver depending on the actual limits of the car. However, the frequent intervention of said electronic driver assistance devices reduces the extent to which high-performance driving can be enjoyed and, therefore, their continuous interferences turn out to be fairly frustrating for a track driver. Hence, in some known cases, manufacturers introduced informative messages (for example, on when to shift gear or on the occurrence of given conditions), which are delivered by the vehicle to the driver through interfaces (for example, a led or a screen) so as to allow the driver to personally carry out the actions, thus increasing the driving pleasure.

However, according to prior art solutions, the vehicle delivers informative messages or signals based on the sole state of the current dynamic of the vehicle (number or revolutions per minute, position of the pedals, open or closed hardtop, gear, steering wheel, etc.) or on the past dynamic thereof (acceleration/deceleration, previous gear, rotation speed of the steering wheel, etc.). In this way, the driver cannot be helped to optimize a cost function (such as time or mileage) based on a mission that the vehicle still has to accomplish.

Furthermore, the informative messages or signals provided by the road vehicle are generally projected onto fixed screens and do not take into account the position from which the driver observes said messages. Therefore, in some cases, a very tall or very short driver can be disadvantaged in the displaying of information or, anyway, due to possible vibrations, the driver can have a hard time actually receiving the informative message.

DESCRIPTION OF THE INVENTION

The object of the invention is to provide a method for the performance-enhancing driver assistance of a road vehicle, to a performance-enhancing driver-assistance system and a road vehicle, which are at least partially free from the drawbacks described above and, at the same time, are simple and economic to be carried out and manufactured.

The invention covers a method for the performance-enhancing driver assistance of a road vehicle, a performance-enhancing driver-assistance system and a road vehicle according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
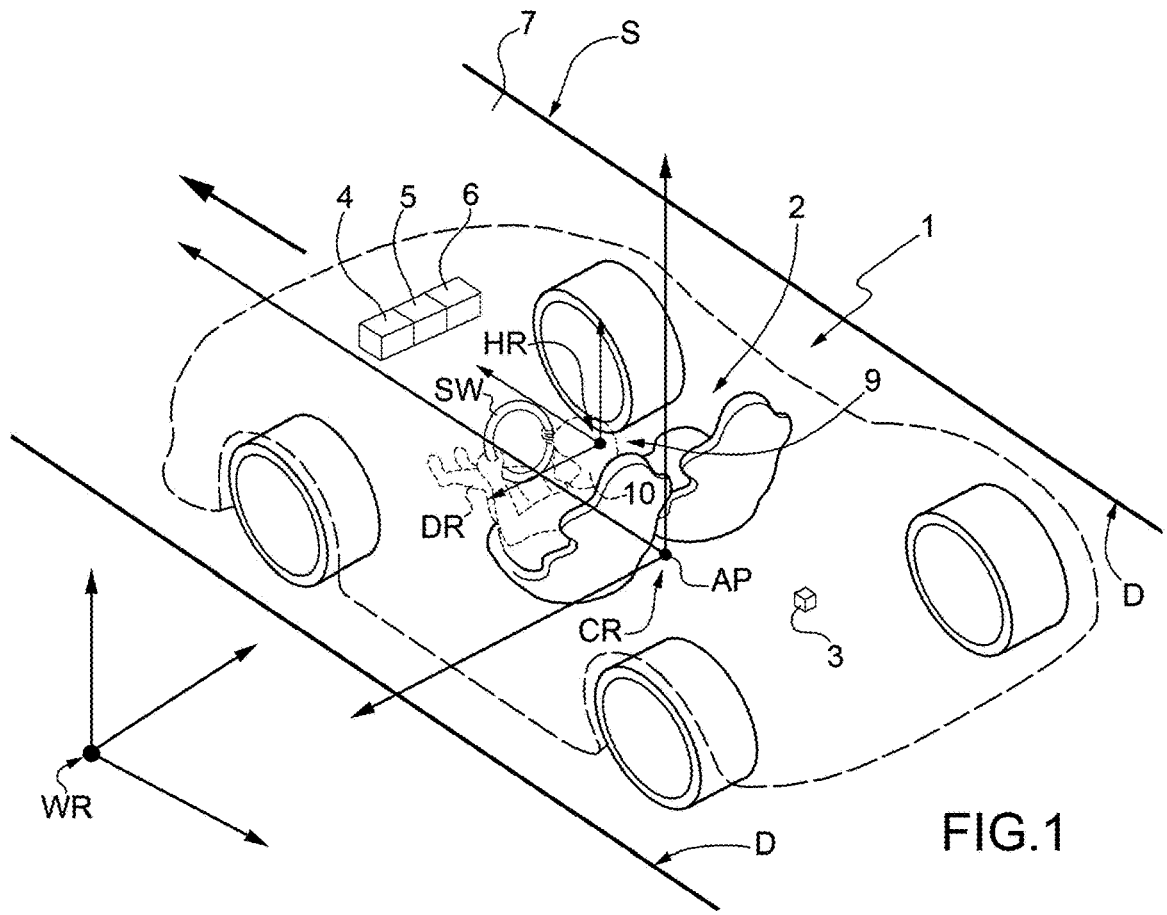
FIG. 1 is a schematic perspective view of a road vehicle driven by a driver according to the invention.

In FIG. 1, number 1 indicates, as a whole, a road vehicle driven by a driver DR and provided with two front wheels and with two rear wheels (in particular, drive wheels). The vehicle 1 is provided with a passenger compartment 2 (shown from the inside in FIG. 3), which is designed to house the driver DR and possible passengers (for example one passenger, like in the non-limiting embodiment of FIG. 1).

The road vehicle 1 comprises a localization device 3, which is configured to identify a current position AP and a current orientation of the road vehicle 1. In particular, the localization device 3 can be any localization device using radio waves with a short range (e.g., short range radio wave localization devices commercially available under the trademarks ARVA® or RECCO®) or with a long range (GPS). In some non-limiting cases, the localization device 3 comprises a device designed to detect the position AP of the road vehicle 1 and processes the orientation of the vehicle based on the direction in which it moves and on the position of the front wheels. In other non-limiting cases, the localization device 3 comprises both the device configured to detect the position AP of the road vehicle 1 and a device configured to detect the space orientation thereof (for example, an electronic three-axis compass or an inertial measurement unit—IMU). In this way, a reference frame CR integral to the road vehicle 1 can be defined in the space. The term "orientation" indicates, in this case, the angular position of the reference frame CR (namely, of three axes orthogonal to one another) relative to the cardinal directions or to another suitable reference point (in particular, preferably an inertial one). In particular, the orientation is mainly determined along two axes parallel to the ground in which the vehicle stands, whereas a third vertical axis is mainly used to determine the gradient of the ground. More in particular, indeed, the vehicle 1 is not subjected to movements of inclination relative to the ground (except for those irrelevant cases due to the elasticity of the suspensions, to sudden braking or accelerations).

According to some non-limiting embodiments, like the one shown in FIG. 1, the road vehicle 1 also comprises one or more ADAS (Advanced Driver-Assistance Systems) devices 4, which, in particular, comprise a plurality of sensors of different types (cameras, ultrasound, laser, radar, light, humidity, temperature, etc.) and are configured to detect a plurality of (space-related and non-space-related) environmental data ED concerning the environment where the road vehicle 1 operates.

For example, the environmental data ED comprise, among other things: the development and the delimitations D of a stretch 7 of road S (or track 8) on which the vehicle 1 is standing; the presence of obstacles (such as, for example, other vehicles, pedestrians, debris) or curbs C; the temperature on the outside of the vehicle 1; air humidity; wind; the features of the road surface; light; etc.

Advantageously, though not necessarily, the plurality of environmental data comprise the height and the position of (fixed and movable) obstacles and/or the position (as well as derivatives thereof, such as speed and acceleration) of cars to be surpassed.

Advantageously, the road vehicle 1 comprises a control system 5, which is configured to detect a plurality of dynamic data DD of the vehicle 1. The control system 5 comprises a plurality of sensors, for instance accelerometers, torque sensors, position sensors, etc. More precisely, the dynamic data DD of the vehicle 1 are, for example: speed and acceleration of the vehicle (both in a longitudinal and in a transverse direction); emitted torque, gear, number or revolutions per minute of the engine and derivatives thereof; position of the pedals (brake, accelerator and possibly clutch), driving mode (racing, city, sports, eco); open/closed hardtop; position of the steering wheel SW, etc.

Figure 4:
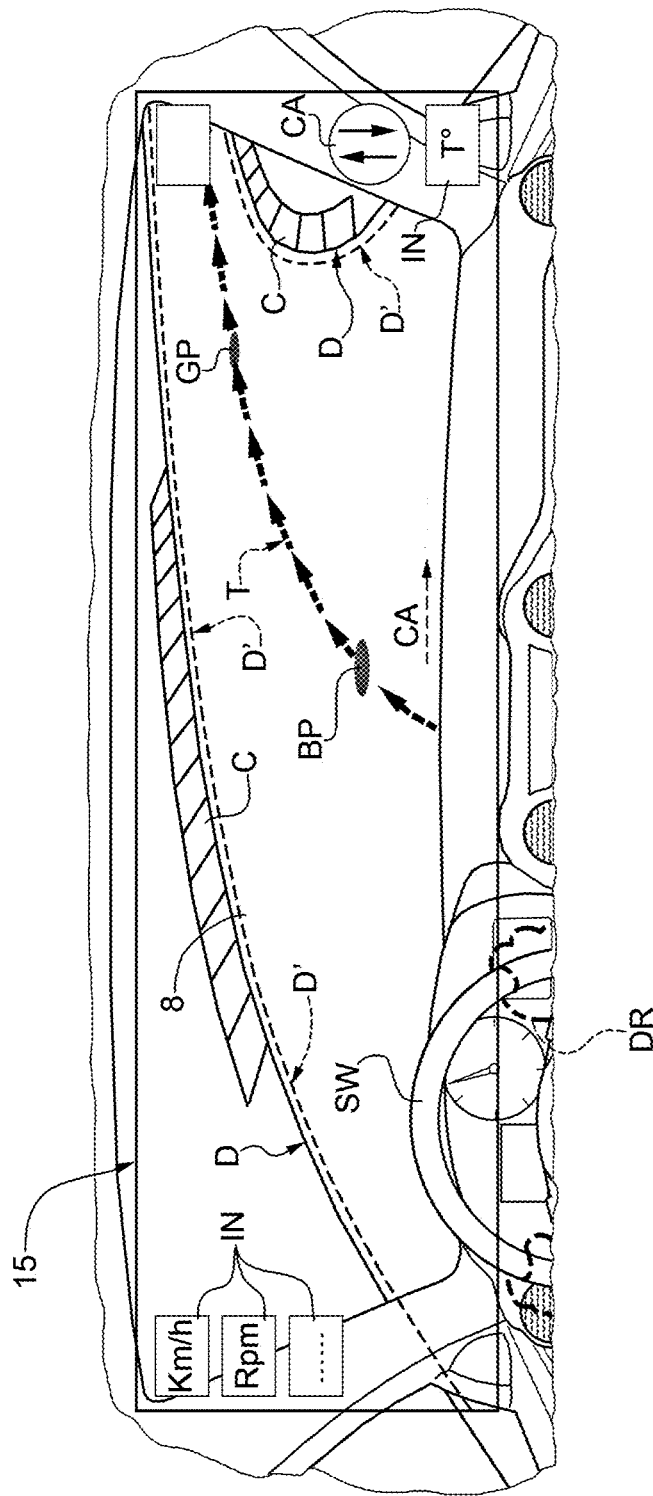
FIG. 4 is a schematic perspective view of a possible view of the driver of FIG. 3.

Advantageously, though not necessarily and according to the non-limiting embodiment of FIG. 1, the vehicle 1 comprises a calculation unit 6 (arranged on the inside or on the outside on board the vehicle 1), which is configured to process a mission (as is generally shown in FIG. 4) optimizing a cost function CF from the current position AP of the vehicle to an arrival point (such as, for example, when driving on a track, the finish line).

In particular, especially when driving on a track, the cost function CF to be optimized is time.

Therefore, the mission M defines a trajectory T and a plurality of time-related driving commands (accelerations, decelerations, gear shifts, etc.) calculated by the calculation unit 6 in order to minimize the time needed to drive from the current position AP to the arrival point. In particular, the arrival point is the final point of the trajectory T.

In other non-limiting embodiments which are not shown herein, the cost function CF to be optimized is different from time. For example, the cost function CF could be the fuel consumption and/or the tire wear (to be minimized) and, hence, the mileage (to be maximized). In this case, the mission M is a trajectory T calculated by the calculation unit 6 in order to minimize the fuel consumption and/or the tyre wear, in particular also taking into account, in the calculation, the dynamic data DD and the environmental data ED of the vehicle 1. For example, the calculation unit 6 processes the mission M (hence, the trajectory T) taking into account the gradient of the path (steep uphill slopes determine a larger consumption of fuel), the time needed to cover the stretch of road, etc.

Figure 2:
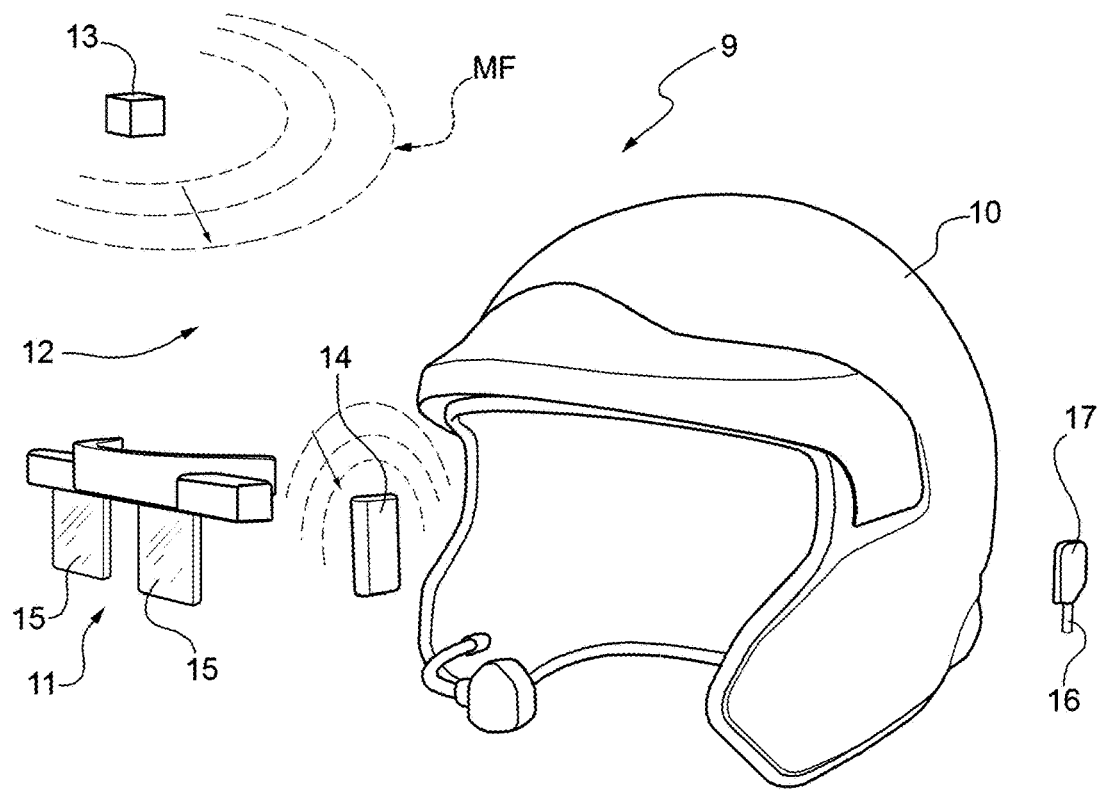
FIG. 2 is a schematic perspective and exploded view of a system according to the invention.
Figure 3:
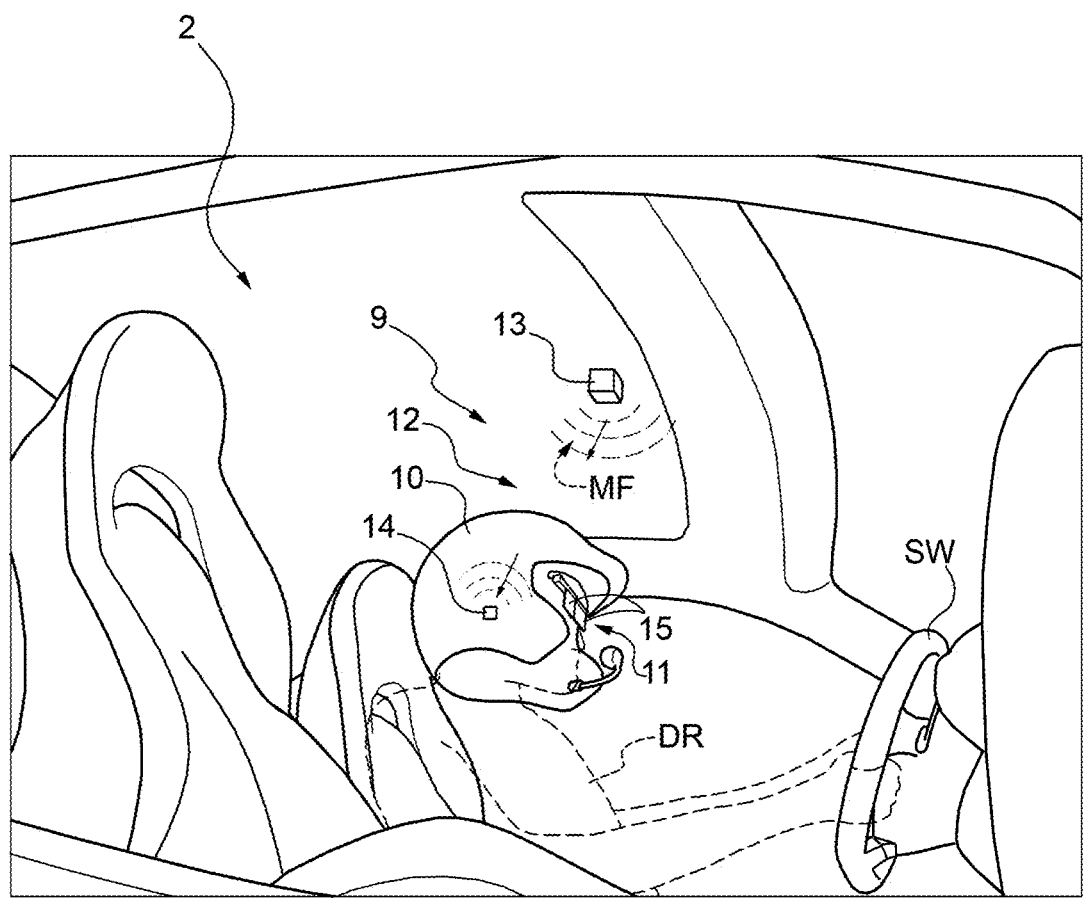
FIG. 3 is a schematic perspective view of the system of FIG. 2 from the inside of the passenger compartment of the road vehicle driven by the driver of FIG. 1.

In FIG. 2, number 9 indicates, as a whole, a performance-enhancing driver-assistance system comprising a helmet 10, which, in use, is worn by the driver DR (as shown in FIGS. 1 and 3).

Furthermore, the system 9 comprises an augmented reality interface device 11, which is configured to be mounted on and/or connected to the helmet 10.

In some non-limiting cases, the interface device 11 is mounted on the helmet by means of a mechanical coupling device (not shown). In other non-limiting cases, the interface device 11 is mounted on the helmet 10 by means of a magnetic coupling device.

In further non-limiting cases, the interface device 11 is worn by the driver DR.

Advantageously, though not necessarily, the interface device 11 is electrically connected to the helmet 10. In this way, the device 11 can be supplied with power and can be used to transmit messages and/or information to the driver DR. More precisely, the interface device 11 is configured to display, for the driver DR, the mission M as well as information IN concerning the driving state and the corrective actions CA to be carried out in order to accomplish the mission M. In other words, the interface device 11 is configured to project suggestions advising the driver DR on how to improve his/her performance in order to reach the mission M and, subsequently, follow the mission M.

The system 9 further comprises a detection device 12, which is configured to determine the position and the orientation of the helmet 10 within the road vehicle 1 (in particular, inside the passenger compartment).

In the non-limiting embodiment of FIGS. 2 and 3, the detection device 12 comprises an electromagnetic source unit 13, which can be mounted on the road vehicle 1, in particular in a fixed position, and an electromagnetic receiver unit 14, which is configured to be mounted on the helmet 10 so as to be integral to the helmet 10.

Advantageously, though not necessarily, the source unit 13 and the receiver unit 14 each comprise at least three coils. In particular, the three coils of each unit 13, 14 are arranged on axes that are orthogonal to one another (so as to form three-axis triad). More precisely, the three coils of the source unit 13 are configured so as to be activated by an alternating electric current in order to each emit a variable magnetic field (schematically shown in FIG. 2) creating a spherical measuring area. The variable magnetic field MF energizes the three coils of the receiver unit 14, which, hence, determine a variation of the magnetic field MF itself. Based on the variation of the magnetic field generated by the coils of the receiver unit 14, it is possible to determine, once the position of the source unit 13 is known, the position and the orientation of the receiver unit 14, namely of the helmet 10. In other words, by taking into account the fact that the source unit 13 is fixed in a known position of the passenger compartment 2 of the vehicle 1 (for example, in a central roof lamp or inside or under the dashboard, etc.) and by placing the receiver unit 14 so that it is integral to the helmet 10, it is possible to define in real time (obviously, following an empirical adjustment) the position and the orientation (with six degrees of freedom) of the helmet 10 relative to the source unit 13.

In other non-limiting embodiments which are not shown herein, the detection device 12 comprises one or more visible or infrared light cameras, which are configured to detect the position of the head of the driver DR.

Advantageously, though not necessarily and according to the non-limiting embodiment of FIG. 2, the interface device 11 comprises two semitransparent lenses 15 (namely, which allow the driver to see anyway the road through them), which are configured to be placed in front of the eyes of the driver DR of the road vehicle 1 (according to FIG. 3) and to suggest one or more corrective actions CA to be carried out in order to accomplish a mission M optimizing a cost function CF. In particular, the lenses 15 have a level of transparency greater than or equal to 70%.

In some non-limiting embodiments, like the one shown in FIG. 2, the system 9 comprises a cable 16 to power the receiver unit 13 and the interface device 11 by means of a connector 17 mounted on the helmet 10. As an alternative or in addition, the system 9 comprises a power storage device, for example a lithium ion battery, which is mounted on the helmet 10 so as to power the receiver unit 13 and the interface device 11.

Advantageously, though not necessarily and according to the non-limiting embodiment of FIG. 3, the road vehicle 1 comprises the performance-enhancing driver-assistance system 9. In particular, in the example of FIG. 3, the source unit 13 is fixed in the upper part of the passenger compartment 2 (for example, roof lamp or roof), whereas the receiver unit 14 is mounted so as to be integral to the helmet 10 (for example, in the area of a central part of the helmet 10).

According to a further aspect of the invention, there is provided a method for the performance-enhancing driver assistance of the road vehicle 1, in particular driven by the driver DR.

Advantageously, though not necessarily, the method comprises a step of determining, in use, the current position AP and orientation of the road vehicle 1 in the space by means of the localization device 3. In particular, a reference frame CR integral to the vehicle 1 is defined in the space.

In the non-limiting case in which the road vehicle 1 drives along a track 8, the method comprises the step of detecting a plurality of space data concerning the structure of the track (for example, distances, gradients, radius of curvature, etc.). These data can be detected through upload from a database containing the data of the different tracks and by means of sensors mounted on board the vehicle 1.

Figure 5:
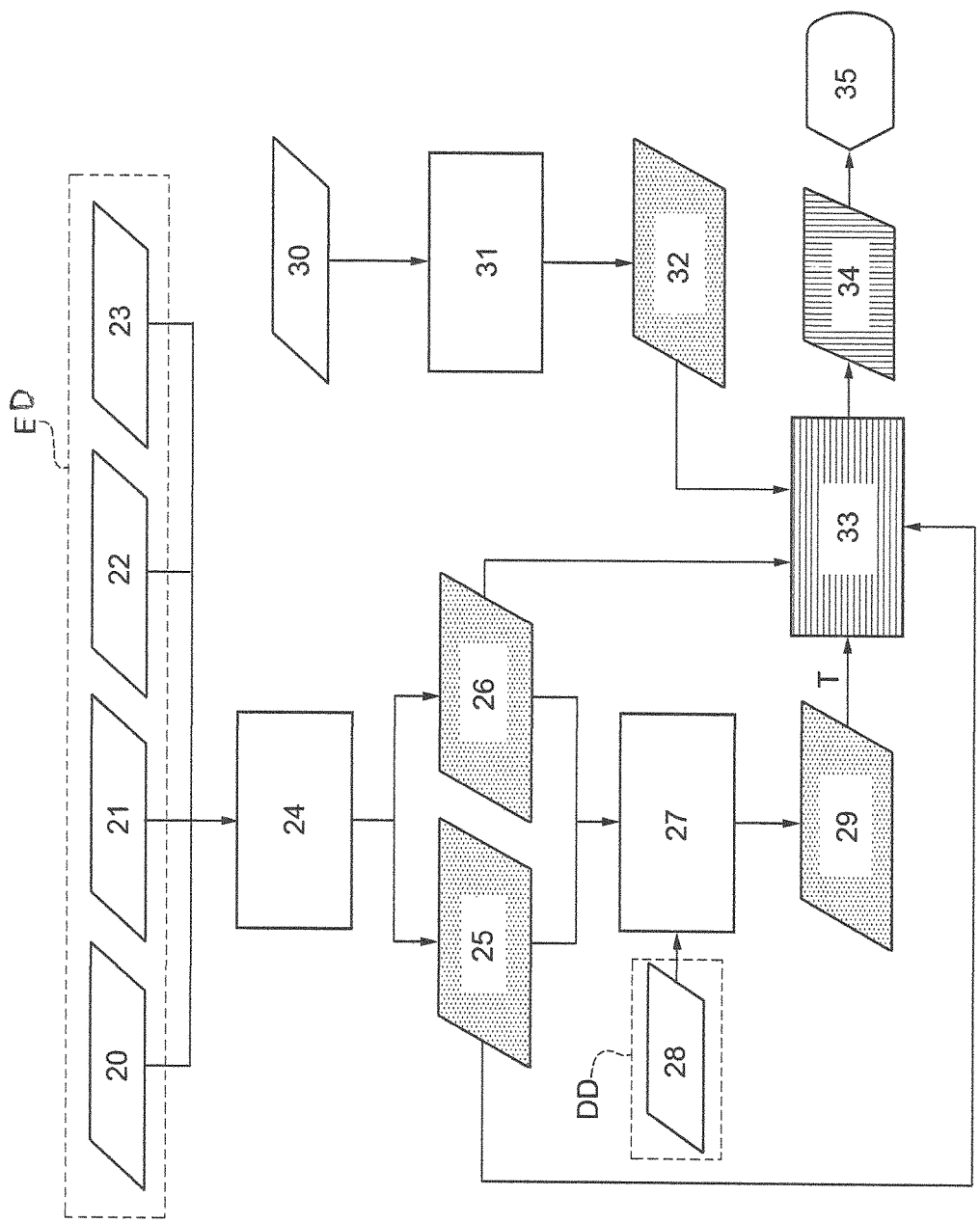
FIG. 5 is a schematic diagram showing a possible embodiment of the method according to the invention.

According to the non-limiting embodiments of FIG. 5, the method comprises the steps of detecting, in use, the plurality of environmental data ED concerning the environment in which the road vehicle 1 operates by means of the ADAS devices 4 and of detecting, in use, the plurality of dynamic data DD of the vehicle 1 described above by means of the control system 5. In this way, the vehicle 1 is aware, instant by instant, of the environment surrounding it and of how it is moving within said environment. In particular, the vehicle 1 is aware of the stretch of road S ahead of itself.

Advantageously, though not necessarily, the environmental data ED also comprise the position and/or the height of the curbs on the track or the humidity of the air (on the outside of the vehicle) and/or the features of the road surface (namely, of the asphalt) as well as the temperature thereof or the position of cars to be surpassed.

According to some non-limiting embodiments, the method comprises the further step of cyclically determining, in use, the position and the orientation of the helmet 10 worn by the driver. In particular, a three-axis reference frame HR, which is integral to the helmet 10, is determined in the space, as shown in FIG. 1. In this way, the point of view of the driver DR as well as what his/her eyes see instant by instant from their position can be comprised.

According to some non-limiting embodiments, like the one shown in FIG. 4, the method comprises the further step of suggesting to the driver DR, by means of the augmented reality interface device 11 and depending on the current position and orientation of the helmet as well as on the plurality of environmental data ED and dynamic data DD, one or more corrective actions CA to be carried out in order to accomplish the mission M optimizing the cost function CF.

According to the non-limiting embodiment shown in FIG. 4, the interface device 11 shows, besides the corrective actions CA to be carried out (such as, for example, an instruction to downshift because the vehicle is getting close to a bend or arrows indicating on which side to turn in order to get closer to the mission M or the number of revolutions per minute and the speed to be reached when approaching a bend), also shows information IN, such as, for example, the number of revolutions per minute, an external temperature T° or a temperature of the brakes, etc.

In the non-limiting embodiment of FIG. 4, the driver DR also sees the trajectory T defined by the mission M. in order to optimize the desired cost function CF, for example time.

In some non-limiting cases, the interface device 11 transmits the corrective actions CA to the driver DR by means of said two at least partially transparent lenses 15 arranged in the area of the helmet 10 and between the eyes of the driver DR and the stretch of road S ahead of the road vehicle 1. In the non-limiting embodiment of FIG. 4, the interface device 11 is mounted on the helmet 10 so as to be arranged like glasses for the driver DR. In other non-limiting embodiments which are not shown herein, the interface device 11 comprises other types of interface, not necessarily provided with lenses 15.

Advantageously, though not necessarily, the method comprises the further step of compensating the movements of the helmet 10, namely of the head of the driver DR (and of the relative reference frame HR), suggesting the corrective actions CA by anchoring them to the inertial reference frame WR. In this way, the corrective actions CA, including the trajectory T, and the information IN are superimposed (from the point of view of the driver DR) to the pictured environment in which the road vehicle 1 operates. For example, the items of information IN can comprise the distance or the height of the curbs C or of the delimitations D, etc.

Advantageously, though not necessarily, the corrective actions CA are displayed within the interface device 11 so as to be integral to the ground, in particular to an inertial reference frame WR. In this way, the virtual information displayed can be superimposed, in a concordant manner, on the real world.

Advantageously, though not necessarily, the mission M is cyclically updated and, as a consequence, the corrective actions CA are changed instant by instant based on the current position and orientation of the helmet 10 (reference frame HR) and on the plurality of environmental data ED (reference frame WR) and dynamic data DD (which, together with the current position AP and orientation of the vehicle 1, determine the reference frame CR).

Advantageously, though not necessarily, the mission M determines an optimal trajectory T (which is part of the corrective actions CA and is shown in FIG. 4) depending on the current position AP of the vehicle, on the environmental data ED and on the dynamic data DD of the vehicle 1. In other words, when covering the optimal trajectory T, the road vehicle 1 moves from the current position AP to an arrival point optimizing the cost function CF (hence, accomplishing the mission M). In particular, together with the trajectory T, the mission M also defines a plurality of driving parameters, such as, for example, the speed in each point of the trajectory, the most convenient gear, the acceleration, the position of the steering wheel SW, etc. These parameters are suggested to the driver DR through the corrective actions CA and the information IN, for example as shown in the non-limiting embodiment of FIG. 4.

In the non-limiting embodiment of FIG. 4, the driver DR also sees the trajectory defined by the mission M.

In the non-limiting embodiment of FIG. 4, the corrective actions CA and/or the information IN comprise a braking point BP, for example before a bend or, anyway, along the optimal trajectory T, and, as an alternative or in addition, a gearshift point GP, which suggests when and in which direction to shift gear (downshift or upshift). The braking point BP and the gearshift point GP progressively get close to the road vehicle 1 as the driver follows the optimal trajectory T.

Advantageously, though not necessarily, the step of compensating the movements of the helmet 10 and/or of the vehicle 1 is carried out depending on the current position AP and orientation of the road vehicle 1, on the current position and orientation of the helmet 10, on the plurality of environmental data ED and, in particular, on the plurality of dynamic data DD. For example, the movements of the helmet 10 and/or of the vehicle 1 are compensated by means of known transformations (in particular, matrix transformations) in order to switch from a reference frame HR, CR, WR to the other. In particular, once the system is aware of the current position AP and orientation of the vehicle 1 as well as of the position and the orientation of the helmet 10 (hence, of the head and of the point of view of the driver DR) within the passenger compartment 2 thanks to the detection device 12, it is possible to process the corrective actions CA (namely, the projections within the lenses 15), which, to the eyes of the driver, are integral to the inertial reference frame WR.

Advantageously, though not necessarily, the corrective actions CA are calculated in real time. In order words, the control unit 6 processes the data received in real time.

In some non-limiting cases, for example when a small-sized, light and economic control unit 6 is used (which generally features longer processing and latency times compared to larger or very expensive control units), the step of compensating the movements of the helmet 10 and/or the movements of the vehicle 1 is carried out depending on an expected position and orientation of the road vehicle 1 (namely, the position and the orientation of the vehicle, hence of the reference frame CR, are estimated in an estimated time instant following the current one), on the current position and orientation of the helmet 10 (reference frame HR), on the plurality of environmental data ED and, in particular, on the plurality of dynamic data DD. In this way, a possible latency in the calculation and in the transmission of the corrective actions CA and of the information IN can be balanced out.

Advantageously, though not necessarily, the estimated time instant is less than one second away from the current time instant. In this way, a better synchronization between the corrective actions CA and the real world is ensured.

In the non-limiting case in which the vehicle 1 is driving on a track 8 provided with delimitation D, the method comprises the step of determining, only once, a virtual model of the track 8. In particular, the virtual model of the track 8 is a three-dimensional model.

Advantageously, though not necessarily, and according to the non-limiting embodiment of FIG. 4, the method also comprises the step of cyclically superimposing, in use, delimitations D' of the track of the virtual model on the delimitation D of the actual track 8. In particular, the delimitations D of the actual track 8 are detected by means of at least one camera (in particular, two cameras arranged on the right and left side of the vehicle). The superimposition of the delimitations D' and D of the virtual and actual track 8 allows the compensating step to be optimized, making it stronger.

In some non-limiting cases, the position and the orientation of the helmet 10 (namely, the reference frame HR) are determined using at least one optical device, in particular an infrared camera.

In other non-limiting cases, the position and the orientation of the helmet 10 (namely, the reference frame HR) are determined using the electromagnetic detection device 12, in particular provided with the source unit 13 and with the receiver unit 14.

The non-limiting embodiment of FIG. 5 illustrates a diagram showing a possible functional layout of the method described above. The rectangular blocks indicate processing steps, whereas the parallelogram-shaped blocks indicate inputs. The last block indicates the output (in particular, through the interface device 11 and the lenses 15).

According to the non-limiting embodiment of FIG. 5, the vehicle 1 detects the environmental data ED. In particular, the environmental data ED comprise data detected by a LIDAR device 20 (for the 3D mapping of the surroundings of the vehicle) and by side cameras 21 (for the detection of the delimitations D and D') as well as data detected by the localization device 3, namely data of the inertial measurement unit 22 and of a GNSS device 23. The environmental data ED (detected in blocks 20-23) are used in block 24 to process a virtual model of the track 8, based on which a three-dimensional (or two-dimensional) map of the track 8 (block 25) and the position of the vehicle 1 within the track 8 (block 26) are determined. In block 27, the mission M is processed, in particular taking into account the dynamic data DD of the road vehicle 1 detected in block 28. Subsequently, based on the mission M, the optimal trajectory T is defined in block 29. Simultaneously with this, the electromagnetic detection device 12 detects a quantity of data concerning the position of the helmet 10 within the passenger compartment 2 (block 30) and allows the system to process and trace (block 31) the position of the helmet 10 and, hence, of the head of the driver DR, which is transformed so as to be defined in inertial coordinates, namely relative to the reference frame WR. The inertial position of the helmet 10 (block 32) is sent to the control unit 6, which (block 33) processes the position of the vehicle (from block 26), the optimal trajectory T (from block 29), the map of the track 8 (from block 25) and the position of the helmet from block 32. In particular, this processing is carried out in inertial coordinates and compensates the movement of the helmet 10 so as to provide the driver DR with suggestions (i.e. corrective actions CA and information IN) that are integral to the real world.

Then, the control unit 6 processes a frame flow (block 34) to be transmitted to the augmented reality interface device, namely the lenses 15, which (output block 35) transmit the suggestions to the driver DR without blocking his/her view of the actual track 8.

Advantageously, though not necessarily, the vehicle 1 described above is configured to carry out the method disclosed so far.

Even though the invention described above relates to a specific embodiment example, it should not be considered as limited to said embodiment example, for its scope of protection also includes all those variants, changes or simplifications covered by the appended claims, such as, for instance, a different cost function optimization method, a different type of vehicle (for example, a two-wheel vehicle or a front-drive vehicle), different dynamic or environmental data, a different type of augmented reality interface, a different compensating method etc.

The invention offers many advantages.

First of all, it enhances the performances of a driver driving a road vehicle by suggesting the driver corrective actions that are calculated not only based on the current dynamic of the vehicle, but also based on the future path to be covered by the vehicle. In this way, the driver can receive suggestions on when to accelerate, decelerate, shift gear and on which trajectory to follow based on what the vehicle perceives around itself.

Furthermore, the invention actively helps the driver obtain good performances by means of a customized displaying of information, which is adapted to the movements of the head of the driver. In this way, the driver is actually allowed to see the points in which to brake, accelerate, or shift gear, besides the optimal trajectory to be followed in order to reduce track lap times or maximize mileage.

A further advantage of the invention lies in the possibility of giving instructions to the driver by showing information that are useful for the adjustment of his/her driving styles, such as the temperature of the brakes or of the tyres, without forcing the driver to take the eyes off the track.

By so doing, the safety of the driver is increased, as there are no moments in which he/she has to keep the eyes on the dashboard and not on the road ahead of the vehicle.

Furthermore, the invention increases the safety of the vehicle, since, in case of danger situations, such as the closeness of an obstacle at a high speed, the interface system described herein can warn the driver, in an immediately visible manner, of the presence of a danger, indicating the direction in which to steer and when to downshift in order to restore the safety of the driver and of the vehicle.

In addition, thanks to the possibility of transmitting suggestions by means of an augmented reality interface, the learning of the driver and the improvement of his/her driving ability are facilitated.

LIST OF THE REFERENCE NUMBERS OF THE FIGURES 1 road vehicle
2 passenger compartment
3 localization device
4 ADAS devices
control system
6 control unit
7 stretch of road
8 track
9 system
10 helmet
11 interface device
12 detection device
13 source unit
14 receiver unit
15 lenses
16 cable
17 connector
ED environmental data
DD dynamic data
DR driver
CF cost function
CA corrective actions
AP current position
D delimitations
C curbs
S road
M mission
T trajectory
IN information
BP braking point
GP gearshift point
CR reference frame of the vehicle
HR reference frame of the head
WR inertial reference frame
D' virtual delimitations

The invention claimed is:

1. A method for a performance-enhancing driver assistance of a road vehicle (1) driven by a driver (DR); the method comprising:
   determining, in use, a current position (AP) and orientation of the road vehicle (1) in a space by means of a localization device (3);
   detecting, in use, a plurality of environmental data (ED) concerning an environment in which the road vehicle (1) operates by means of ADAS devices (4);
   detecting, in use, a plurality of dynamic data (DD) of the vehicle (1) by means of a control system (5);
   cyclically determining, in use, a current position and a current orientation of a helmet (10), which is worn by the driver (DR), within a passenger compartment of the road vehicle (1);
   suggesting to the driver (DR), by means of an augmented reality interface device (11) and depending on the current position and current orientation of the helmet (10) as well as on the plurality of environmental data (ED) and the plurality of dynamic data (DD), one or more corrective actions (CA) to be carried out in order to accomplish a mission (M) optimizing a cost function (CF); and
   compensating movements of the helmet (10), namely of the head of the driver (DR), and/or movements of the vehicle suggesting the one or more corrective actions (CA), wherein compensating the movements of the helmet (10) and/or the movements of the road vehicle is carried out depending on an expected position and expected orientation of the road vehicle (1), on the current position and current orientation of the helmet (10), on the plurality of environmental data (ED) and on the plurality of dynamic data (DD).

2. The method according to claim 1, wherein:
the mission (M) comprises an optimal trajectory (T) determined depending on the current position (AP) of the road vehicle, on the plurality of environmental data (ED) and on the dynamic data (DD) of the road vehicle; and
when covering the optimal trajectory, the road vehicle (1) moves from the current position (AP) to an arrival point optimizing the cost function (CF).

3. The method according to claim 1, wherein compensating movements of the helmet (10), namely of the head of the driver (DR), and/or movements of the vehicle suggesting the one or more corrective actions (CA) by anchoring them to an inertial reference frame (WR) so as to superimpose the one or more corrective actions (CA) on the environment in which the road vehicle (1) operates.

4. The method according to claim 3, wherein compensating the movements of the helmet (10) and/or the movements of the vehicle is carried out depending on the current position (AP) and current orientation of the road vehicle (1), on the current position and current orientation of the helmet (10), on the plurality of environmental data (ED) and on the plurality of dynamic data (DD).

5. The method according to claim 1, wherein the road vehicle is inside a track (8), which is provided with delimitations (D), and the method further comprises determining, only once, a virtual model of the track (8); and a step of superimposing delimitations (D') of the track (8) of the virtual model upon the delimitations (D) of the actual track (8) detected by means of a camera, so as to optimize a compensating step.

6. The method according to claim 1, wherein the current position and the current orientation of the helmet (10) are determined using at least one optical device comprising an infrared camera, or at least one electromagnetic detection device (12) provided with an electromagnetic source unit (13) and with an electromagnetic receiver unit (14).

7. The method according to claim 1, wherein the cost function (CF) to be optimized is the time needed to go from the current position (AP) of the road vehicle to an arrival point of the road vehicle (1).

8. The method according to claim 1, wherein the plurality of environmental data (ED) comprises a presence of obstacles and/or positions of cars to be surpassed.

9. A performance-enhancing driver-assistance system (9) comprising:
a helmet (10), configured to be worn, in use, by a driver (DR) within a passenger compartment of a road vehicle (1);
an augmented reality interface device (11) mounted on and/or connected to said helmet (10) configured to display, for the driver, a mission (M) that optimizes a cost function (CF); and
a detection device (12) configured to determine a current position and current orientation of the helmet (10) within the road vehicle (1) based on changes in a magnetic field between an electromagnetic source mounted at a fixed location on the road vehicle and an electromagnetic receiving unit mounted to the helmet;
wherein the augmented reality device displays one or more corrective actions (CA) to the driver for the mission (M) that optimizes the cost function (CF) based on the current position and current orientation of the helmet (10), a plurality of environmental data (ED), and a plurality of dynamic data (DD), and wherein the augmented reality device compensates for movements of the helmet (10), namely of the head of the driver (DR), and/or movements of the vehicle suggesting the one or more corrective actions (CA) based on an expected position and expected orientation of the road vehicle (1), on the current position and current orientation of the helmet (10), on the plurality of environmental data (ED) and on the plurality of dynamic data (DD).

10. The system (9) according to claim 9, wherein the detection device (12) comprises an electromagnetic source unit (13) configured to be mounted at a fixed position on the road vehicle (1), and an electromagnetic receiver unit (14) configured to be mounted on said helmet (10) so as to be integral to the helmet (10).

11. The system (9) according to claim 10, wherein the electromagnetic source unit (13) and the electromagnetic receiver unit (14) each comprise at least three coils arranged on axes that are orthogonal to one another; the three coils of the source unit (13) being configured to each emit a variable magnetic field, which excites said at least three coils of the electromagnetic receiver unit (14), thus allowing, through a change generated by at least three coils of the electromagnetic receiver unit (14) due to the excitation, the current position and current orientation of the helmet (10) to be determined based on the change in the magnetic field emitted by the three coils of the electromagnetic source unit (13).

12. The system (9) according to claim 10, wherein the electromagnetic receiver unit (14) and the augmented reality interface device (11) can be powered by means of a power supply cable connected to the road vehicle (1) and/or by means of a power storage device.

13. A road vehicle (1) comprising:
a localization device (3) configured to identify a current position and current orientation of the road vehicle (1);
one or more ADAS devices (4) configured to detect a plurality of environmental data (ED) concerning an environment in which the road vehicle (1) operates;
a control system (5) configured to detect a plurality of dynamic data (DD) of the vehicle; and
a system (9) according to claim 10.

14. The system (9) according to claim 9, wherein the augmented reality interface device (11) comprises at least one semi-transparent lens, which is configured to be placed in front of the eyes of the driver (DR) of the road vehicle (1) and to suggest one or more corrective actions (CA) to be carried out in order to accomplish a mission (M) optimizing a cost function (CF).

* * * * *